Figure 3:
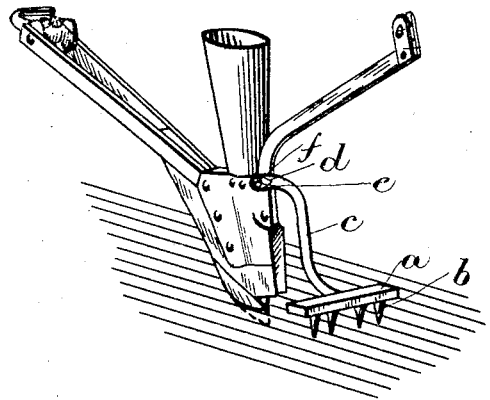

No. 779,416. PATENTED JAN. 10, 1905.
J. VON DZIEMBOWSKI.
RAKE DEVICE FOR DRILL MACHINES.
APPLICATION FILED NOV. 28, 1903.
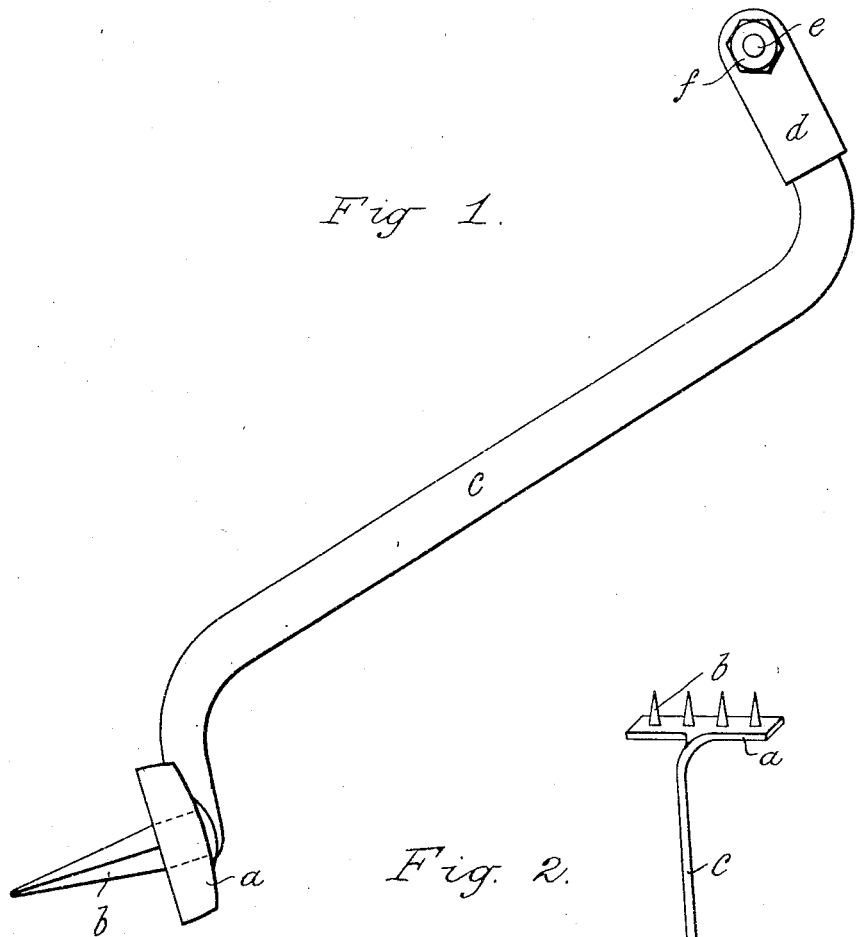

No. 779,416. Patented January 10, 1905.

UNITED STATES PATENT OFFICE.

JULIAN VON DZIEMBOWSKI, OF SOSSNITZ, NEAR ALTRADEN, GERMANY.

RAKE DEVICE FOR DRILL-MACHINES.

SPECIFICATION forming part of Letters Patent No. 779,416, dated January 10, 1905.

Application filed November 28, 1903. Serial No. 183,013.

*To all whom it may concern:*

Be it known that I, JULIAN VON DZIEMBOWSKI, a subject of the Emperor of Germany, residing at Sossnitz, near Altraden, district of Mogilno, Germany, have invented certain new and useful Improvements in Rake Devices for Drill-Machines, of which the following is a specification.

This invention relates to an improvement in drill-machines, and has, in particular, reference to that part of such machines which is intended to fill up the furrows caused by the point of the drill-share after the seed has been planted; and the object of this invention is to supersede the appliances hitherto in use for the said object by providing a new, simple, inexpensive, and effective device, which will be hereinafter more fully described, reference being had to the accompanying sheet of drawings, in which—

Figure 1 is a side elevation of the new device, while Fig. 2 is the device as seen from below. Fig. 3 is a perspective view showing the device applied to a grain-drill tube.

Referring to the accompanying drawings, the new device consists of an iron rail or bar $a$, into which are riveted four prongs $b$. To this bar is welded or otherwise fastened a curved round iron rod $c$. The latter is provided at its upper end with a head $d$, divided into two cheeks, which are fitted with a hole adapted to receive a pin $e$, the latter having a screw-thread at one end and being adapted to receive a screw-nut $f$ for the purpose of being fastened or tightened.

In order to attach the new rake device onto a drill-share, I remove the upper one of the two rivets connecting the lever of the drill-share which serves to receive the weights and on which the drill-share is moved up and down with the drill-share body, and into the opening thus freed is inserted the pin $e$ of the new rake device after the wall of the drill-share has been made to be embraced by the cheeks of the new device. The screw-nut is thereupon fastened to a moderate extent, so that the new device will be suspended loosely. The pin in this case replaces the rivet and forms at the same time the hinge-pivot or spindle for the new device. The rail or bar $a$ is now loosely suspended behind the opening or outlet of the share.

When the drill-machine is in operation, the rail or bar $a$ is loosely dragged along behind the share of the drill-machine, but owing to the prongs $b$ cannot penetrate too deeply into the ground or soil, so that only the said prongs $b$, acting as they do in the manner of a rake, fill the earth into the slight furrows drawn by the point of the drill-share, the result being that the seed is properly and not too much covered with earth. The dead-weight of the rail or bar $a$ effects that after passing over or surmounting stones or other obstacles on the ground it will immediately drop down again, and in this case the drill-share is not caused to be raised together with the rake, as the latter works independently of the drill-share.

When drilling beet-seed, it is advisable to provide each share with the new rake device; but it will in most cases of drilling seeds of other kinds be sufficient to only provide the longer shares with a rake each.

Having thus described my invention, what I claim as new therein, and desire to secure by Letters Patent, is—

1. In a drill-machine the combination of the drill-share, a rake-arm pivotally connected to the drill-share in rear thereof, a rake-head arranged transversely to the rake-arm and a plurality of teeth protruding from the under side of the rake-head to enter the soil.

2. In a drill-machine the combination of the drill-share, a rake-arm having a bifurcated end to embrace the opposite sides of the drill-share, a pin passing transversely through the bifurcated end and drill-share to pivotally connect the rake-arm thereto, a transversely-disposed rake-head rigidly connected to the free end of the rake-arm and a plurality of teeth protruding from the under side of the rake-arm to enter the soil.

In witness whereof I have hereunto signed my name, this 24th day of July, 1903, in the presence of two subscribing witnesses.

JULIAN VON DZIEMBOWSKI.

Witnesses:
HUBERT B. CEWRTZ,
HEINRICH LEMKE.